United States Patent
Mirsky et al.

(10) Patent No.: US 6,217,288 B1
(45) Date of Patent: Apr. 17, 2001

(54) METHOD AND APPARATUS FOR LIMITING A CRITICAL VARIABLE OF A GROUP OF COMPRESSORS OR AN INDIVIDUAL COMPRESSOR

(75) Inventors: Saul Mirsky; Naum Staroselsky, both of West Des Moines, IA (US)

(73) Assignee: Compressor Controls Corporation, Des Moines, IA (US)

( * ) Notice: Subject to any disclaimer, the term of this patent is extended or adjusted under 35 U.S.C. 154(b) by 0 days.

(21) Appl. No.: 09/008,869

(22) Filed: Jan. 20, 1998

(51) Int. Cl.[7] .................................................. F04B 49/00
(52) U.S. Cl. ............................ 417/53; 417/282; 417/309
(58) Field of Search ............................ 417/53, 282, 309; 60/600

(56) References Cited

U.S. PATENT DOCUMENTS

| | | | |
|---|---|---|---|
| 5,032,062 | * | 7/1991 | Peterson ................................. 417/282 |
| 5,046,928 | * | 9/1991 | Peterson ................................. 417/282 |
| 5,052,899 | * | 10/1991 | Peterson ................................. 417/282 |
| 5,195,875 | * | 3/1993 | Gaston ................................. 417/282 |

* cited by examiner

Primary Examiner—Timothy S. Thorpe
Assistant Examiner—Cheryl J. Tyler
(74) Attorney, Agent, or Firm—Henderson & Sturm LLP

(57) ABSTRACT

This invention discloses a method for limiting a critical variable (such as, discharge pressure or suction pressure or pressure ratio) of either a compressor station or an individual compressor when these machines are subjected to large, fast disturbances. Each configuration, whether a station or an individual compressor, is equipped with two PID controllers: (1) a main controller for compressor critical variables and (2) a limiting controller that participates in modulating recycle valves. At the onset of sudden, large changes of mass flow at a compressor's or station's discharge, the effectiveness of the two controllers (acting independently) may be insufficient to prevent discharge pressure from reaching the shutdown set point which, in turn, disrupts the process supported by the compressors, and the longevity of the drivers is diminished. For these reasons, this disclosure relates specifically to a technique that combines the functions of the main and limiting controllers. Because of the complementary (synergistic) interaction of the controllers, an earlier and faster opening of the antisurge valves is initiated, and pressure at the discharge header is effectively limited.

8 Claims, 3 Drawing Sheets

METHOD AND APPARATUS FOR LIMITING A CRITICAL VARIABLE OF A GROUP OF COMPRESSORS OR AN INDIVIDUAL COMPRESSOR

TECHNICAL FIELD

This invention relates generally to a method and apparatus for controlling process-limiting variables of a turbocompressor network. More specifically, the invention relates to a method for limiting a critical variable of either a group of compressors (compressor station) or an individual compressor when these machines are subjected to large, fast disturbances.

BACKGROUND ART

The present-day method of limiting a critical variable—discharge pressure or suction pressure or pressure ratio—of either a group of compressors (compressor station) or an individual compressor, is carried out by two Proportional-Integral-Derivative (PID) loops: (1) a main-controller loop that acts on the performance of the compressors, such as rotational speed by way of speed controllers, or guide-vane position by way of performance controllers; and (2) a limiting-controller loop of the critical variable that acts on antisurge (recycle) valves by way of antisurge controllers. However, the effect of the main controller (as defined by gains of proportional, integral, and derivative components) is limited by stability conditions for controlling an inertial object like a gas pipeline, and by the rate of load changes (if high) of the gas pumping equipment (including drivers), which can reduce the pumping equipments' longevity.

In its current operating mode, a limiting controller often cannot prevent an emergency shutdown after encountering large, fast disturbances because its set point is very close to an emergency shutdown set point. Thus, the limiting controller initiates action to start opening the recycle valves when the critical variable is close to the emergency shutdown set point. But the stroke time of these valves is usually not less than 2 seconds, and there may be significant volume in the recycle loops; therefore, opening the valves might not prevent emergency shutdown.

Consequently, at the onset of sudden, large changes of mass flow at a compressor's or a compressor station's discharge, the effectiveness of the main and limiting controllers (acting independently) may be insufficient to prevent discharge pressure from reaching the shutdown set point which, in turn, disrupts the process supported by the compressor(s) and decreases the life of the driver(s). Similar problems might occur while limiting the suction pressure in the event of sudden, large changes of mass flow in a compressor's or a compressor station's suction.

DISCLOSURE OF THE INVENTION

The purpose of this invention is to improve upon the prior art by providing a group of compressors or an individual compressor with a method for limiting a critical variable when these machines are subjected to large, fast disturbances. An example of a group of compressors is a compressor station of a gas pipeline; examples of critical variables are discharge pressure, suction pressure, and pressure ratio.

Each compressor is equipped with an antisurge controller whose output modulates an associated antisurge (recycle) valve. And the performance of each compressor is varied by a guide-vane position or rotational speed. In applications with compressors having variable guide vanes, each compressor is equipped with a performance controller which affects the guide-vane positions. In variable speed applications, each driver is supplied with a rotational-speed controller that modulates a final control element. Every group of compressors, as well as every independent compressor, is equipped with two PID controllers: (1) a main controller for compressor critical variables that affects guide-vane position or rotational speed, through the corresponding controller; and (2) a critical-variable limiting controller that participates in modulating recycle valves. Increasing the effectiveness of limiting the critical variable is realized by the main controller's first and second output signals:

The first output signal is used as a set point for the compressor performance controllers to position compressor guide vanes, or as a set point for rotational-speed controllers.

The second output signal corrects the output signal of the limiting controller by comparing against the limiting controller's threshold values, and if higher, by (1) summing with the limiting controller's predefined set point, or (2) summing with the limiting controller's output signal, or (3) performing both operations simultaneously.

As described above, upon achieving the limiting controller's thresholds, the main controller's second output signal can correct the output signal of the limiting controller, thereby increasing the effectiveness of critical-variable limiting because the limiting controller is employed earlier. Accordingly, the collaboration of the main and limiting controllers ensures the reliability of compressor stations and of individual compressors when subjected to large, fast disturbances.

BEST MODE FOR CARRYING OUT THE INVENTION

Figure 1:
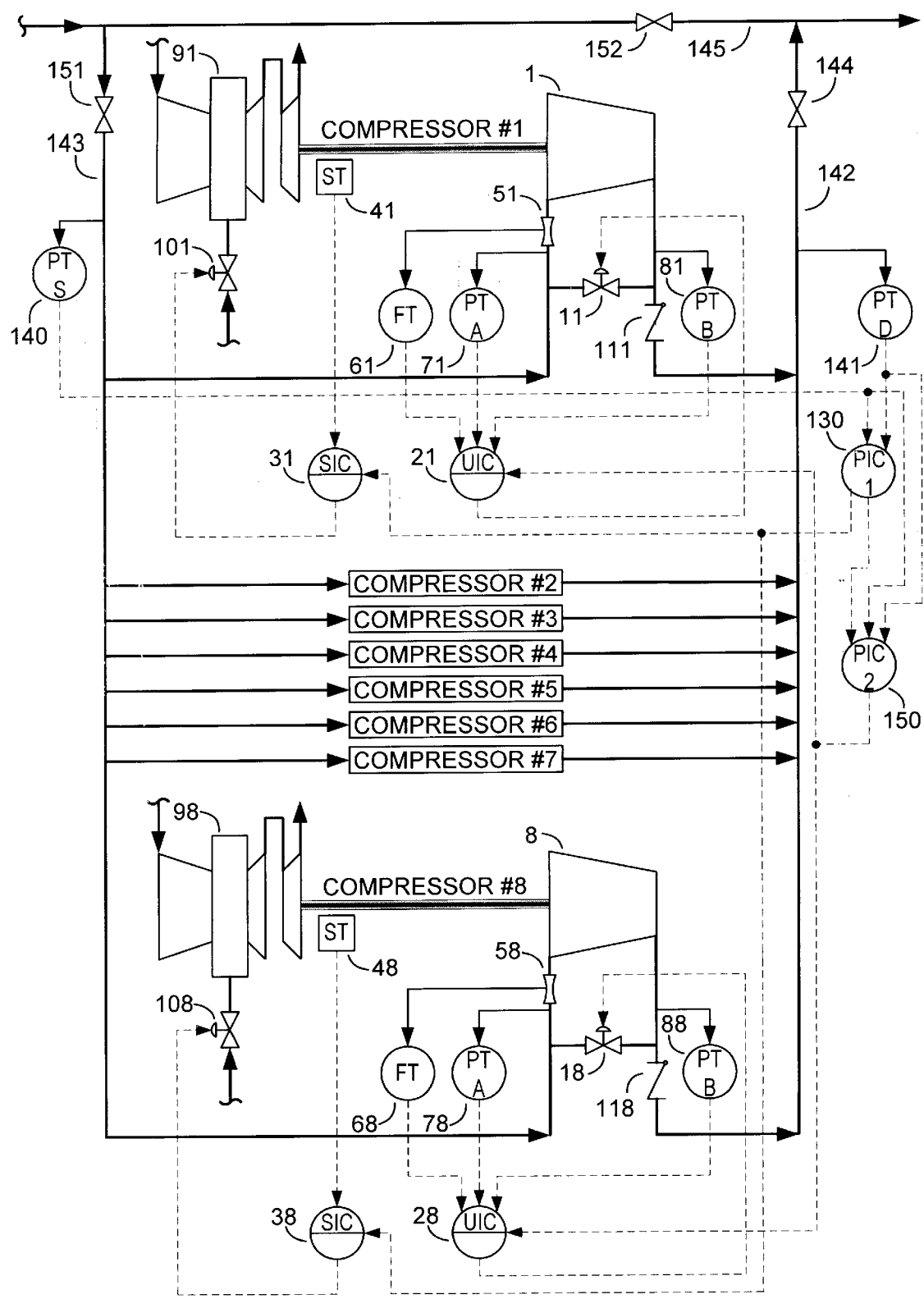
FIG. 1 shows a process and instrumentation diagram of a compressor station for a gas pipeline.

FIG. 1 depicts a compressor station that includes eight gas compressors operating in parallel. Units 1 and 8 are shown fully detailed, whereas units 2 through 7 are simulations, but are identical (or similar) to 1 and 8 with respect to ancillary components in a real, operational setup.

Each of the eight compressors 1–8 is equipped with separate recycle lines; in addition to an antisurge (recycle) valve 11–18, an antisurge controller (UIC) 21–28, a rotational-speed controller (SIC) 31–38, rotational-speed transmitter (ST) 41–48, flow measuring device 51–58 with an associated differential-pressure transmitter (FT) 61–68, suction-pressure transmitter (PT-A) 71–78, and a discharge-pressure transmitter (PT-B) 81–88.

When it is stated herein that FIG. 1 shows "valve 11–18" it is to be understood that while only valves 11 and 18 are shown, just as valve 11 is for compressor 1 and valve 18 is for compressor 8, there would be a valve 12 for compressor 2, a valve 13 (not shown) for compressor 3, a valve 14 (not shown) for compressor 4, a valve 15 (not shown) for compressor 5, a valve 16 (not shown) for compressor 6, and a valve 17 (not shown) for compressor 7. Similarly, other elements that are identified by two numbers with a hyphen between them are really indicating eight of such elements, one for each compressor respectively.

The transmitters FT, PT-A, and PT-B are connected to the inputs of the antisurge controllers (UIC) 21–28 whose signals modulate the recycle valves 11–18. And the rotational-speed transmitters (ST) are connected to the rotational-speed controllers (SIC) 31–38. Each compressor is coupled to a driver (gas turbine, for example) 91–98 which is fitted with a final control element 101–108; and each compressor's output piping is equipped with a check valve 111–118.

Set points for the speed controllers 31–38 are conveyed as the first output signal of a main controller (PIC-1) 130 that, in turn, receives output signals from two pressure transmitters (PT-S, PT-D) 140, 141; only one of these signals is required to control a pressure, but both signals are required to control a pressure ratio. The discharge-pressure transmitter (PT-D) is located at a discharge header 142 to which all compressor outputs are connected by way of check valves 111–118. And compressor inputs are connected to a common suction header 143 that is provided with a suction-pressure transmitter (PT-S) 140. Moreover, the output signals of transmitters PT-S and PT-D are also sent to a limiting controller (PIC-2) 150; only one of these signals is required to limit a pressure, but both signals are required to limit a pressure ratio. The output signal of PIC-2 is sent to each antisurge controller (UIC) 21–28 for participation in modulating the recycle valves 11–18.

A block valve 144 located between the discharge header 142 and a gas pipeline 145, disconnects the station's discharge from the pipeline. Two additional block valves complete the setup: one valve 151 is situated between the suction header 143 and the pipeline; the second valve 152 is installed in the pipeline, parallel with the station.

Figure 2:
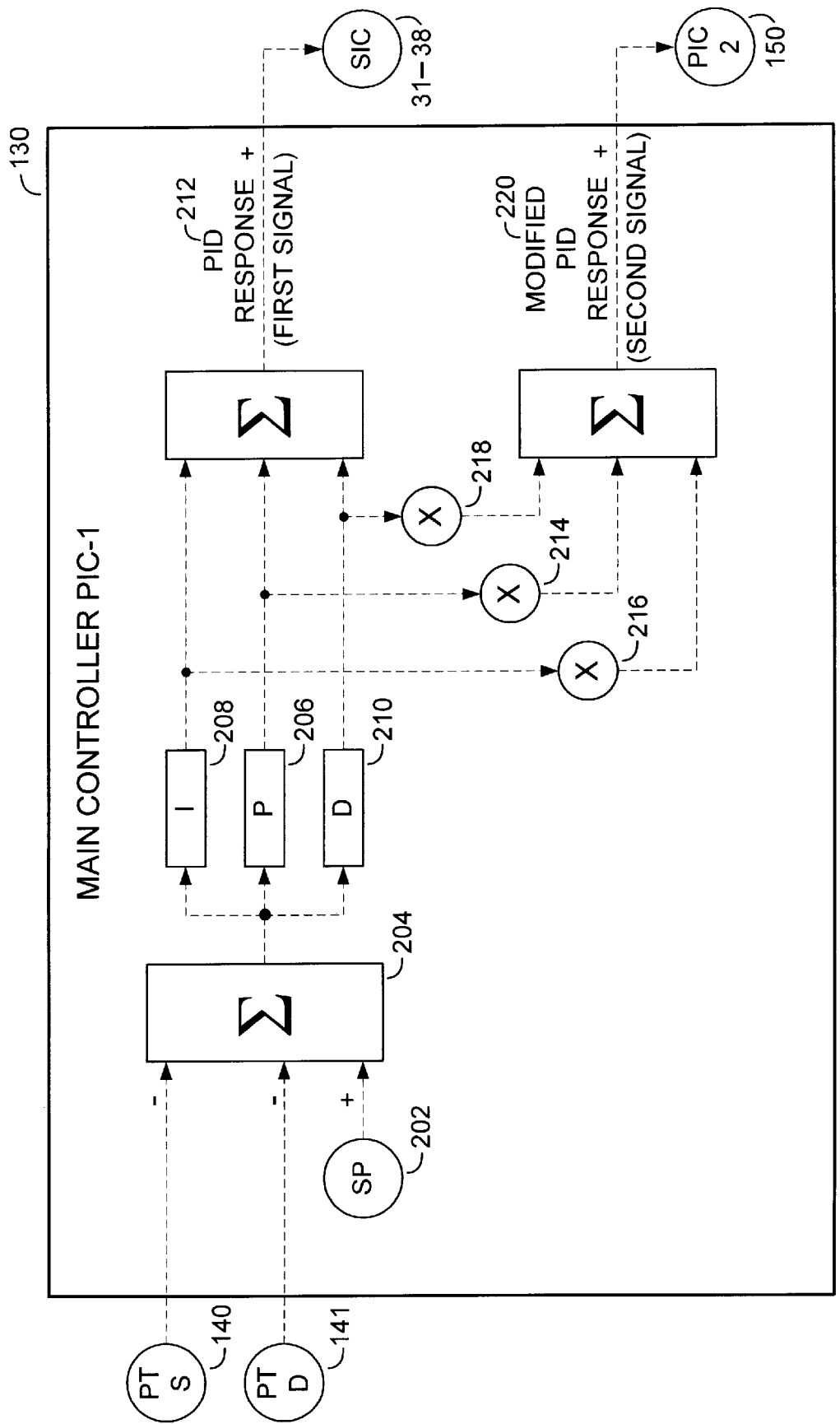
FIG. 2 shows a functional diagram of a main controller.

FIG. 2 shows a functional diagram of a main controller (PIC-) 130 with inputs from two pressure transmitters: PT-S 140 and PT-D 141. The main controller's set point (SP) 202 together with one or both of the pressure transmitter signals 140, 141 (this logic has been described above) are added 204, resulting in an error signal which is passed to three functional blocks: Proportional (P) 206, Integral (I) 208, and Derivative (D) 210. Next, the functional blocks' outputs are added to produce a PID response 212 and, at the same time, processed by their corresponding multipliers 214, 216, 218 (each of these multipliers may have positive, negative, or zero gain), which are then added as a modified PID response 220. Finally, the PID response 212 and the modified PID response 220 become the first and second output signals, respectively.

Figure 3:
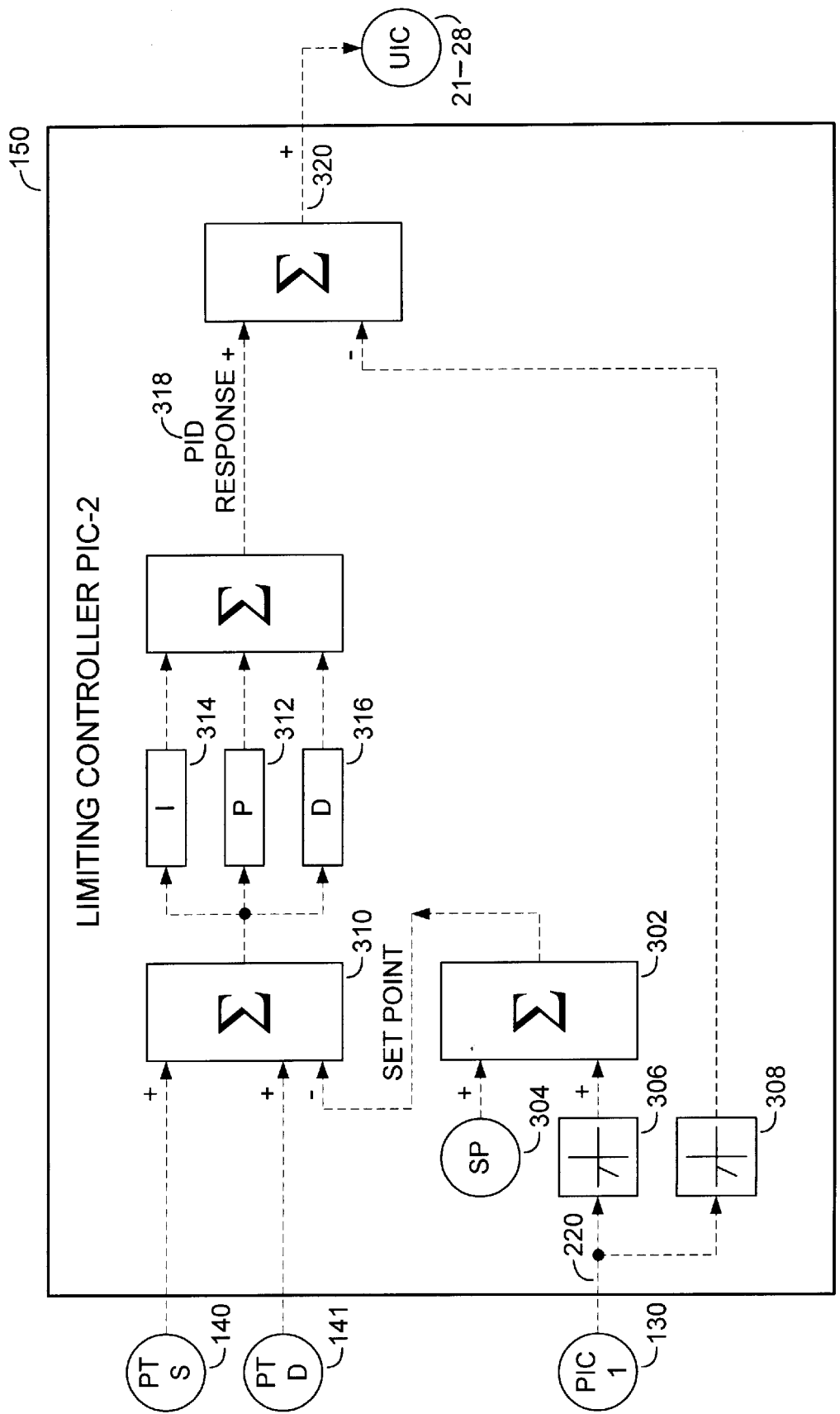
FIG. 3 shows a functional diagram of a limiting controller.

FIG. 3 shows a functional diagram of a limiting controller (PIC-2) 150 with inputs from PT-S 140 and PT-D 141, and an input from the main controller's second output signal 220 which is compared against two thresholds 306, 308. The limiting controller's set point is the output of a summing amplifier 302 and consists of two parts: a fixed part (predefined set point, SP) 304, and a variable part from a threshold comparator 306.

The limiting controller's set point together with one or both of the pressure transmitter signals 140, 141 (this logic has been described above) are added 310 resulting in an error signal which is passed to three functional blocks: Proportional (P) 312, Integral (I) 314, and Derivative (D) 316. Next, the functional block' outputs are added as a PID response 318. Finally, the second threshold comparator 308 signal is added to the PID response 318 resulting in an output signal 320.

Control of a compressor station is performed by a two-level (machine level and station level) system of automatic control, as described below and as illustrated in FIGS. 1, 2, and 3. Both the PIC-1 and PIC-2 controllers 130, 150 maintain and limit the station's discharge pressure; and the output signal from the suction pressure transmitter 140 to these two controllers has zero gain.

At a lower (machine) level, each of the eight compressors and their drivers are regulated by two controllers: speed (SIC) and antisurge (UIC). Speed controllers 31–38 use signals from the speed transmitters (ST) 41–48 to modulate the final control elements 101–108 of the drivers, thereby maintaining rotational speed at their set point. In order to limit the distance between the operating point (if located on the surge control line) and the surge limit line, antisurge controllers 21–28 use signals from the differential-pressure transmitters (FT) 61–68, from the suction-pressure transmitters (PT-A) 71–78, and from the discharge-pressure transmitters (PT-B) 81–88 for modulating each antisurge valve 11–18.

A higher (station) level of the system also comprises two controllers: a main controller (PIC-1) 130 which controls discharge pressure and manipulates the performance of all compressors to maintain discharge pressure in accordance with its set point; and a limiting controller (PIC-2) 150 whose set point is higher than the set point of the main controller—the limiting controller takes control if, during a transient process, the discharge pressure reaches its limit set point.

In the absence of large, fast disturbances, the main controller 130 maintains desired pressure at the discharge header 142 by varying the set point of the rotational-speed controllers 31–38 which modulate the final control elements 101–108 for the drivers 91–98. During operation, the block valve 144 located between the discharge header 142 and pipeline 145 is open, along with the block valve 151 between the suction header 143 and the pipeline, whereas the block valve 152 (installed in the pipeline, parallel with the compressor station) is closed.

If flow through the compressors decreases to the set points of the antisurge controllers 21–28, these controllers open their recycle valves 11–18. When pressure at the discharge header 142 increases above the set point of the main controller 130, the main controller sends a signal that varies the set point of the speed controllers 31–38 to decrease the rotational speed of the compressors by reducing the fuel mass flow rate through the final control elements 101–108. Decreasing the compressors' speed, decreases pressure at the discharge header 142.

In the event that the main controller's second output signal 220 is greater than the limiting controller's two threshold values 306, 308 (see FIG. 3), the limiting controller's set point is decreased and its output signal 320 is increased. This activity is attributed to the decreased set point, or to the additional action directed to the summing amplifier 320, or to both of these actions. However, if the main controller's second output signal 220 is small, it cannot achieve a threshold value of the limiting controller's threshold comparators 306, 308.

Upon sudden closure of the block valve 144 installed in the discharge header 142, discharge pressure will quickly increase, and the ensuing response of the main controller (PIC-1) will, by way of its first output signal 212, decrease the compressors' speed; however, this is insufficient for effective limiting of the discharge header pressure. At the same time, the main controller's second output signal 220

(minus a threshold value) acts to decrease the limiting controller's set point, or to increase its output signal 320, or both. When pressure at the discharge header 142 rises above the decreased set point of the limiting controller (PIC-2), its output signal 320 further increases.

The two procedures described above (or either one of them), functioning through the antisurge controllers 21–28, lead to earlier and faster opening of the antisurge valves 11–18 that recycle gas from the discharge header 142 to the suction header 143. As a result, pressure at the discharge header is limited. Therefore, because of the complementary (synergistic) interaction of the main and limiting controllers, the effectiveness of pressure limiting at the discharge header 142 is greatly improved when compared to the sum of the independent actions of these two controllers, PIC-1 and PIC-2.

Those actions described in this section allow the use of pressure limiting features such as earlier and faster opening of the antisurge valves. After the block valve 144 opens, the compressor station (or individual compressor) can continue to operate.

The economic impact of implementing this method and apparatus (for pressure limiting) is to increase the efficiency and reliability of a compressor station because of the ability to keep the station under control even when influenced by large, fast disturbances. The method and apparatus can also provide: effective compressor station suction-pressure limiting, or pressure-ratio limiting, or limiting of any pressures or pressure ratio of any individual compressor when the main and limiting controllers are limiting a variable that is critical for stabilizing the process. Consequently, the actions and attributes of this invention are also applicable to single-machine operations.

Obviously, many modifications and variations of the present invention are possible in light of the above teachings. It is, therefore, to be understood that within the scope of the appended claims, the invention may be practiced otherwise than as specifically described.

We claim:

1. A method for limiting a critical variable of at least one compressor, by a first output signal of a main controller controlling the capacity of the at least one compressor, and by an output signal of a limiting controller modulating at least one recycle valve, the method comprising:

(a) forming a second output signal of the main controller, simultaneously with the first output signal; and (b) modifying the output signal of the limiting controller by the second output signal of the main controller.

2. The method of claim 1 wherein the second output signal of the main controller modifies the output signal of the limiting controller only when the second output of the main controller exceeds the limiting controller's threshold values.

3. The method of claim 1 wherein modification of the output signal of the limiting controller is achieved by adding the second output signal of the main controller to the set point of the limiting controller.

4. The method of claim 1 wherein modification of the output signal of the limiting controller is achieved by adding the second output signal of the main controller to the output signal of the limiting controller.

5. An apparatus for limiting a critical variable of at least one compressor, by a first output signal of a main controller controlling the capacity of the at least one compressor, and by an output signal of a limiting controller modulating at least one recycle valve, the apparatus comprising:

(a) means for forming a second output signal of the main controller, simultaneously with the first output signal; and (b) means for modifying the output signal of the limiting controller by the second output signal of the main controller.

6. The apparatus of claim 5 wherein the second output signal of the main controller modifies the output signal of the limiting controller only when the second output of the main controller exceeds the limiting controller's threshold values.

7. The apparatus of claim 5 wherein modification of the output signal of the limiting controller is achieved by adding the second output signal of the main controller to the set point of the limiting controller.

8. The apparatus of claim 5 wherein modification of the output signal of the limiting controller is achieved by adding the second output signal of the main controller to the output signal of the limiting controller.

* * * * *